US012244056B2

(12) United States Patent
Yang et al.

(10) Patent No.: US 12,244,056 B2
(45) Date of Patent: Mar. 4, 2025

(54) MOUNTING DEVICE FOR BASE STATION ANTENNA AND BASE STATION ANTENNA SYSTEM

(71) Applicant: Outdoor Wireless Networks LLC, Claremont, NC (US)

(72) Inventors: Xiwei Yang, Jiangsu (CN); Puliang Tang, Jiangsu (CN); Maosheng Liu, Jiangsu (CN); Chen Chen, Jiangsu (CN); Shida Wang, Jiangsu (CN)

(73) Assignee: Outdoor Wireless Networks LLC, Claremont, NC (US)

(*) Notice: Subject to any disclaimer, the term of this patent is extended or adjusted under 35 U.S.C. 154(b) by 150 days.

(21) Appl. No.: 18/171,761

(22) Filed: Feb. 21, 2023

(65) Prior Publication Data

US 2023/0327326 A1 Oct. 12, 2023

(30) Foreign Application Priority Data

Mar. 23, 2022 (CN) ........................ 202210291170.4

(51) Int. Cl.
*H01Q 1/24* (2006.01)
*H01Q 1/12* (2006.01)

(52) U.S. Cl.
CPC .......... *H01Q 1/246* (2013.01); *H01Q 1/1242* (2013.01)

(58) Field of Classification Search
None
See application file for complete search history.

(56) References Cited

U.S. PATENT DOCUMENTS

| | | | | |
|---|---|---|---|---|
| 2019/0058239 | A1* | 2/2019 | Smith | H01Q 21/0025 |
| 2020/0194884 | A1* | 6/2020 | Clifford | H01Q 1/125 |
| 2022/0311122 | A1* | 9/2022 | Patel | H01Q 1/246 |
| 2023/0019212 | A1* | 1/2023 | Wang | H01Q 19/10 |
| 2024/0186711 | A1* | 6/2024 | Li | H01Q 1/42 |
| 2024/0213650 | A1* | 6/2024 | Wang | H01Q 5/42 |
| 2024/0213656 | A1* | 6/2024 | Liu | H01Q 19/108 |

* cited by examiner

*Primary Examiner* — Wilson Lee
(74) *Attorney, Agent, or Firm* — Myers Bigel, P.A.

(57) ABSTRACT

A mounting device for a base station antenna includes a support member having: a first section, the first section being configured to, in a mounted state of a base station antenna and a holding pole, connect with an inner side of the base station antenna facing the holding pole in an end section of the base station antenna; a second section, the second section being configured to, in the mounted state of the base station antenna and the holding pole, extend from the first section in a direction away from the holding pole and extend beyond an end side of the end section in a longitudinal direction of the base station antenna; and a connecting portion that is connected with the second section and configured to be directly or indirectly connected to the holding pole in the mounted state of the base station antenna and the holding pole.

20 Claims, 6 Drawing Sheets

MOUNTING DEVICE FOR BASE STATION ANTENNA AND BASE STATION ANTENNA SYSTEM

RELATED APPLICATION

The present application claims priority from and the benefit of Chinese Patent Application No. 202210291170.4, filed Mar. 23, 2022, the disclosure of which is hereby incorporated herein by reference in full.

FIELD OF THE INVENTION

The present application relates to a mounting device for a base station antenna, and a base station antenna system comprising a base station antenna and a mounting device.

BACKGROUND OF THE INVENTION

In a wireless communication system, the transmission and reception of signals can be achieved by base station antennas. The base station antenna can be mounted on a holding pole via a mounting device. For example, the holding pole may be a tower pole of a communication tower, or a rod or analog made of a reinforced concrete. The ease of mounting and the minimization of the occupied space of the base station antenna can be expected.

FIG. 1A depicts a known base station antenna system 100', wherein three roughly cylindrical base station antennas 10' are respectively mounted to a common holding pole through an upper mounting device and a lower mounting device. FIG. 1B depicts a top view of the base station antenna system 100' and additionally depicts an envelope circle OD of the base station antenna system 100'. Referring to the vertical axis of the holding pole, each mounting device is located radially inside the base station antenna and extends between the holding pole and the base station antenna. When mounting the base station antenna 10', or re-adjusting the attitude of the base station antenna 10', it is difficult to operate the mounting device. In addition, with reference to the vertical axis of the holding pole, in the radial direction, the base station antenna system 100' needs to occupy a larger space. In other words, the diameter of the envelope circle OD visible in FIG. 1B is relatively large. When the base station antenna system 100' is to be covered by an shroud (not shown), the size of the shroud is correspondingly larger, which may not meet the requirements of the user of the base station antenna system 100'. Typically, the inner diameter of the roughly cylindrical shroud may be slightly larger than the diameter of the envelope circle. An exemplary shroud 70 is depicted in FIG. 11. The shroud 70 will be described in more detail later.

FIG. 2A and FIG. 2B depict another known base station antenna system 100", wherein three "flat" column-shaped base station antennas 10" are respectively mounted to a common holding pole through an upper mounting device and a lower mounting device. Only one of the base station antennas 10" is depicted in FIG. 2B, and the other two base station antennas 10" are hidden, so that the mounting device used to mount the base station antenna 10" to the holding pole can be observed more clearly. Similar to the base station antenna system 100" shown in FIGS. 1A and 1B, in the base station antenna system 100" shown in FIGS. 2A and 2B, referring to the longitudinal axis of the holding pole, each mounting device is located radially inside the base station antenna and extends between the holding pole and the base station antenna. When mounting the base station antenna 10", or re-adjusting the attitude of the base station antenna 10", the operation of the mounting device is difficult, and the base station antenna system 100" needs to occupy a larger space in the radial direction.

SUMMARY OF THE INVENTION

An object of the present application is to propose a mounting device for base station antenna and a base station antenna system comprising a base station antenna and a mounting device, wherein the base station antenna may be easily mounted and may occupy a small mounting space.

A first aspect of the present invention relates to a mounting device for a base station antenna, the mounting device including a support member, the support member including:

- a first section, the first section being configured to, in a mounted state of a base station antenna and a holding pole, connect with an inner side of the base station antenna facing the holding pole in an end section of the base station antenna;
- a second section, the second section being configured to, in the mounted state of the base station antenna and the holding pole, extend from the first section in a direction away from the holding pole and extend beyond an end side of the end section in a longitudinal direction of the base station antenna; and
- a connecting portion, the connecting portion being connected with the second section, and the connecting portion being configured to be directly or indirectly connected to the holding pole in the mounted state of the base station antenna and the holding pole.

A compact base station antenna system can be realized through a mounting device according to an embodiment of the present invention. Although the axial size of the base station antenna system may be slightly increased, it is typical that the axial size may be non-sensitive. On the contrary, the size of the base station antenna system in the radial direction may be critical.

In some embodiments, the first section may be configured to be connected to the inner side of the base station antenna facing the holding pole at its free end that faces away from the second section.

In some embodiments, the first section may be configured to extend parallel to the longitudinal direction of the base station antenna in the mounted state of the base station antenna and the pole.

In some embodiments, the first section may have a connecting member, the connecting member being configured to connect two adjacent support members to each other.

In some embodiments, the second section may be configured to extend parallel to the end side of the end section of the base station antenna in the mounted state of the base station antenna and the holding pole.

In some embodiments, the second section may be configured to, in the mounted state of the base station antenna and the holding pole, not extend radially outward beyond the base station antenna.

In some embodiments, the second section may be configured to, in the mounted state of the base station antenna and the holding pole, not exceed the outer side of the base station antenna facing away from the holding pole in the radial direction.

In some embodiments, the connecting portion may be configured to extend from the second section in a direction away from the base station antenna in the mounted state of the base station antenna and the holding pole.

In some embodiments, at least one of the first section, the second section, and the connecting portion may be a plate-like component.

In some embodiments, the first section, the second section, and the connecting portion may be respectively a flat plate-like component.

In some embodiments, at least one of the first section, the second section, and the connecting portion may be a rod component.

In some embodiments, at least one of the first section, the second section, and the connecting portion may be a frame component.

In some embodiments, the second section may be bent approximately 90° relative to the first section, and/or the connecting portion may be bent approximately 90° relative to the second section.

In some embodiments, at least one of the first section, the second section, and the connecting portion may be a prefabricated separate component.

In some embodiments, the support member may be integrally formed by a metal plate.

In some embodiments, the support member may be a welded member.

In some embodiments, the support member may be made of light metal materials, such as aluminum materials.

In some embodiments, the mounting device may include a mounting plate configured to be mounted to a holding pole, and a connecting portion of the support member may be configured to be connected with the mounting plate.

In some embodiments, the connecting portion of the support member may be configured for direct connection with the mounting plate by, such as bolt connection.

In some embodiments, the connecting portion of the support member may be configured for indirect connection with the mounting plate through a component having an adjustable length, so that the mechanical tilt angle of the base station antenna can be achieved with the help of the component having an adjustable length.

In some embodiments, the component having an adjustable length may include a bolt and a set of sleeves, each sleeve having a different length and being possible to be mounted on the shaft of the bolt as a spacer. Each sleeve can determine different mechanical tilt angles of the base station antenna. Depending on a desired mechanical tilt angle, a suitable sleeve can be selected from the set of sleeves and be sleeved on the shaft of the bolt.

In some embodiments, the mounting plate may be made of light metal materials, such as aluminum materials.

In some embodiments, the mounting device may include a clamping device configured to be fastened to the holding pole.

In some embodiments, the mounting plate may be configured to be mounted to the clamping device from above the clamping device.

In some embodiments, the clamping device may include a pair of clamping members, and the pair of clamping members may be configured to hold the holding pole tightly.

In some embodiments, the pair of clamping members may be made of light metal materials, such as aluminum materials.

In some embodiments, the mounting plate may have a main surface and an abutting surface bent from the main surface, the abutting surface being configured to be connected with a connecting portion of a support member, wherein the main surface has an open notch and the mounting plate is capable of being fitted onto a holding pole through the notch.

In some embodiments, the mounting plate may have a hexagonal outer profile, the notch is open from the center of the main surface to one side of the hexagon, and the mounting plate has three abutting surfaces bent from the main surface, each abutting surface corresponding to one side of the hexagon. Optionally, the three abutting surfaces may have an angular spacing of approximately 120°.

A second aspect of the present invention relates to a base station antenna system, which includes a base station antenna, the base station antenna having two opposing end sections, wherein the base station antenna may be mounted to a holding pole through a mounting device according to any one of the embodiments in at least one of the two end sections.

In some embodiments, the base station antenna system may include a single base station antenna.

In some embodiments, the base station antenna system may include two, three, four or more base station antennas.

In some embodiments, the base station antenna system may include a plurality of base station antennas, and each base station antenna is mounted to a holding pole through the mounting device in at least one of the two end sections of the base station antenna.

In some embodiments, the base station antenna system may include three base station antennas, and each base station antenna is mounted to a holding pole through a corresponding mounting device in two end sections of the base station antenna.

In some embodiments, the base station antenna system may include a first mounting plate, the first mounting plate being configured to be mounted to a holding pole, and three upper support members that match upper end sections of three base station antennas may be connected to the first mounting plate through corresponding connecting portions.

In some embodiments, the first sections of the three upper support members that match the upper end sections of the three base station antennas may have two opposing connecting members respectively, and each two adjacent upper support members may be mutually connected through two adjacent connecting members thereof.

In some embodiments, the base station antenna system may include a second mounting plate which is configured to be mounted to a holding pole, and three lower support members that match lower end sections of three base station antennas may be connected to the second mounting plate through corresponding connecting portions.

In some embodiments, the first sections of the three lower support members that match the lower end sections of the three base station antennas may have two opposing connecting members respectively, and each two adjacent lower support members may be mutually connected through two adjacent connecting members thereof.

The technical features already mentioned above, the technical features to be mentioned below and the technical features shown separately in the drawings can be arbitrarily combined with each other as long as the combined technical features are not contradictory. All feasible feature combinations are technical contents expressly described herein. Any one of a plurality of sub-features contained in the same sentence may be applied independently without necessarily being applied together with other sub-features.

BRIEF DESCRIPTION OF THE DRAWINGS

The present disclosure will be explained in more detail by means of exemplary embodiments with reference to the schematic attached drawings.

DETAILED DESCRIPTION OF THE EMBODIMENTS

Exemplary embodiments of the present application will be described below with reference to the attached drawings. However, it should be understood that the present application can be presented in many different ways and is not limited to the embodiments described below. It should also be understood that the embodiments disclosed in the present disclosure may be combined in various ways so as to provide more additional embodiments. In all the attached drawings, the same reference signs may represent the same or functionally identical elements.

Figure 1A:
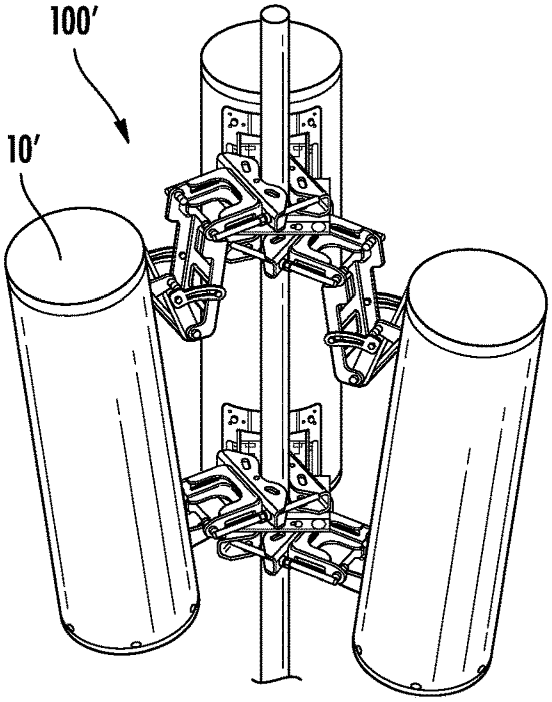
FIGS. 1A and 1B are a perspective view and a top view of a known base station antenna system.
Figure 1B:
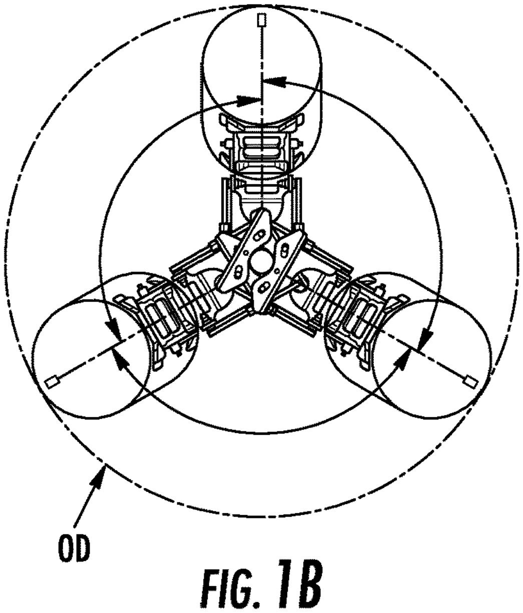
Figure 2A:
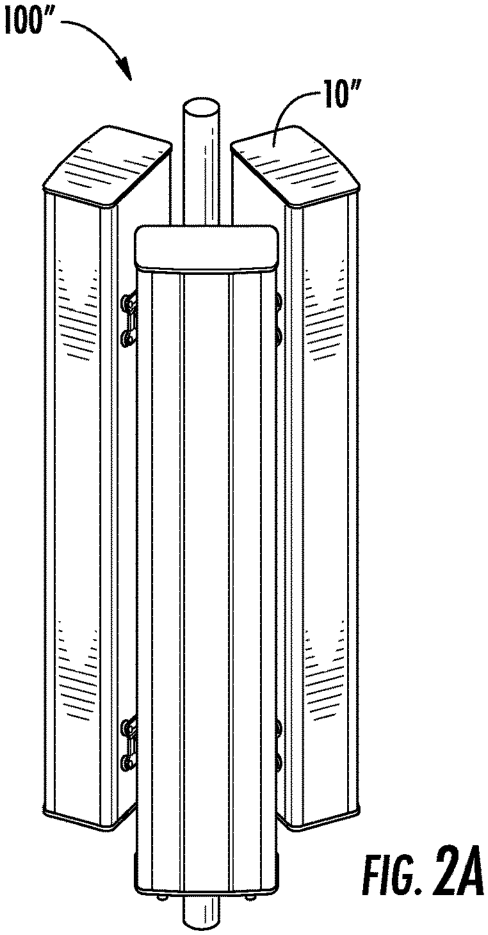
FIGS. 2A and 2B are two different perspective views of another known base station antenna system.
Figure 2B:
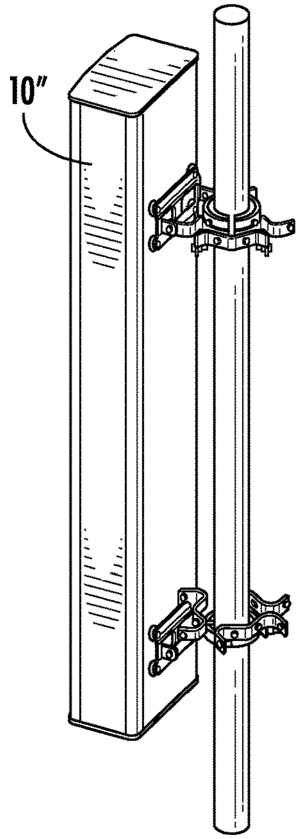
Figure 3:
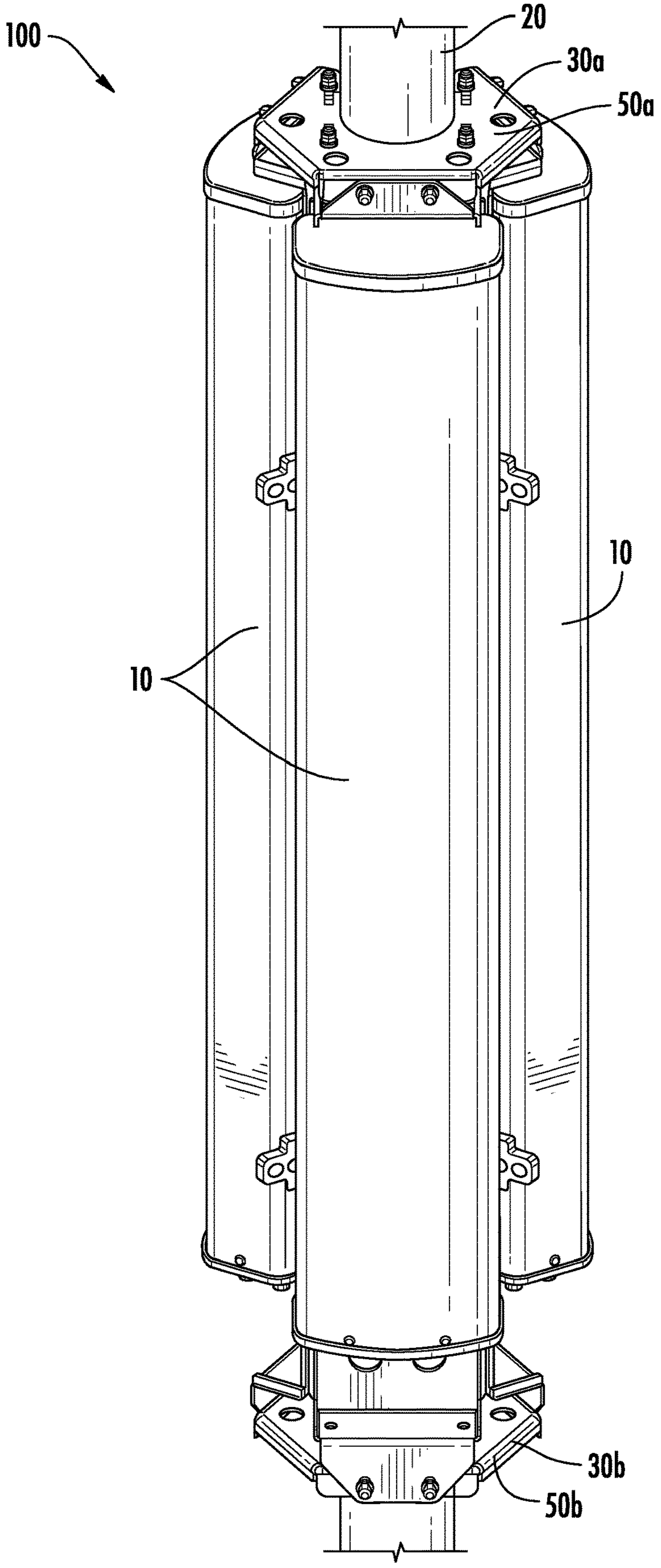
FIG. 3 is a perspective view of a base station antenna system in a mounted state according to an embodiment of the present invention.

FIG. 3 is a perspective view of a base station antenna system 100 in a mounted state according to an exemplary embodiment of the present invention. In the embodiment as shown in FIG. 3, three base station antennas 10 are mounted to a common holding pole 20 at a uniform angular spacing through corresponding mounting devices. The holding pole 20 is depicted in part of its length. The holding pole 20 may be, for example, a tower pole of a communication tower. In FIG. 3, the holding pole 20 is depicted in a vertical direction. It can be understood that in the communication tower pole, the holding pole can extend in a tilted manner relative to the horizontal plane.

Figure 4A:
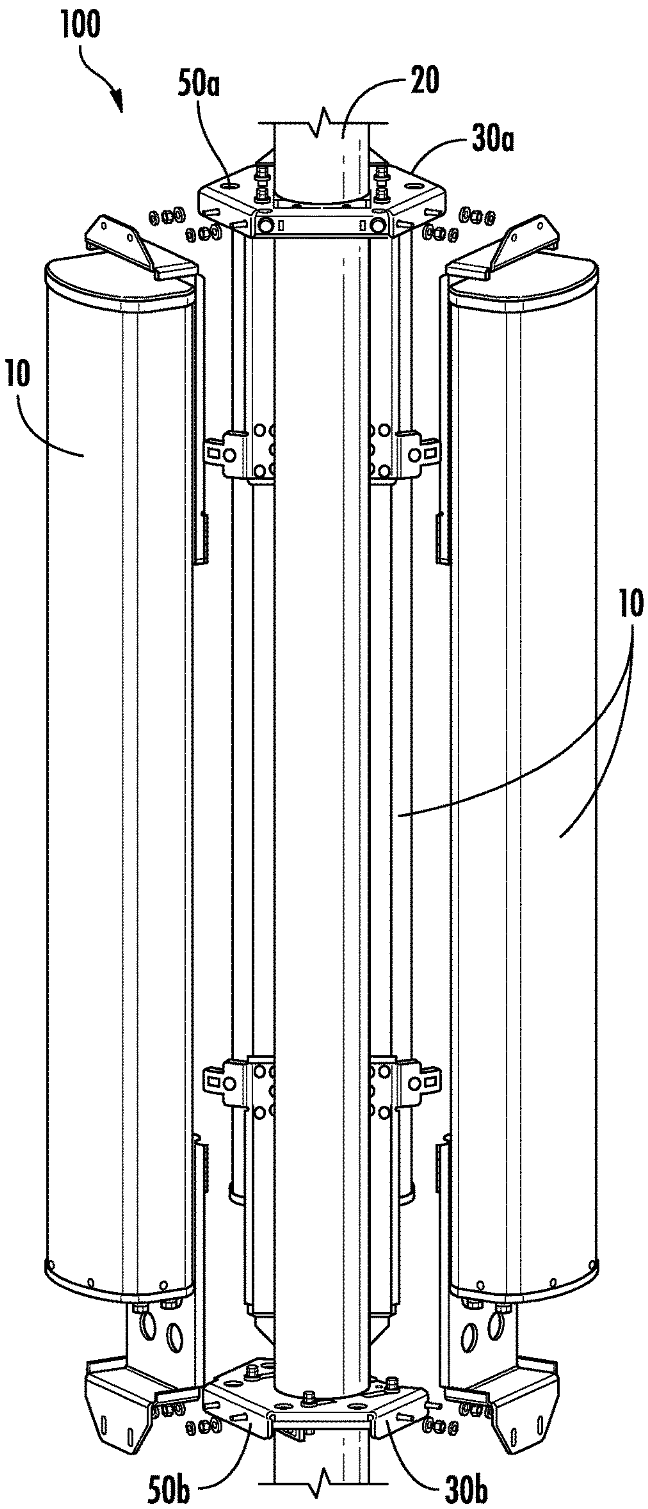
FIGS. 4A and 4B are two different exploded views of the base station antenna system of FIG. 3.
Figure 4B:
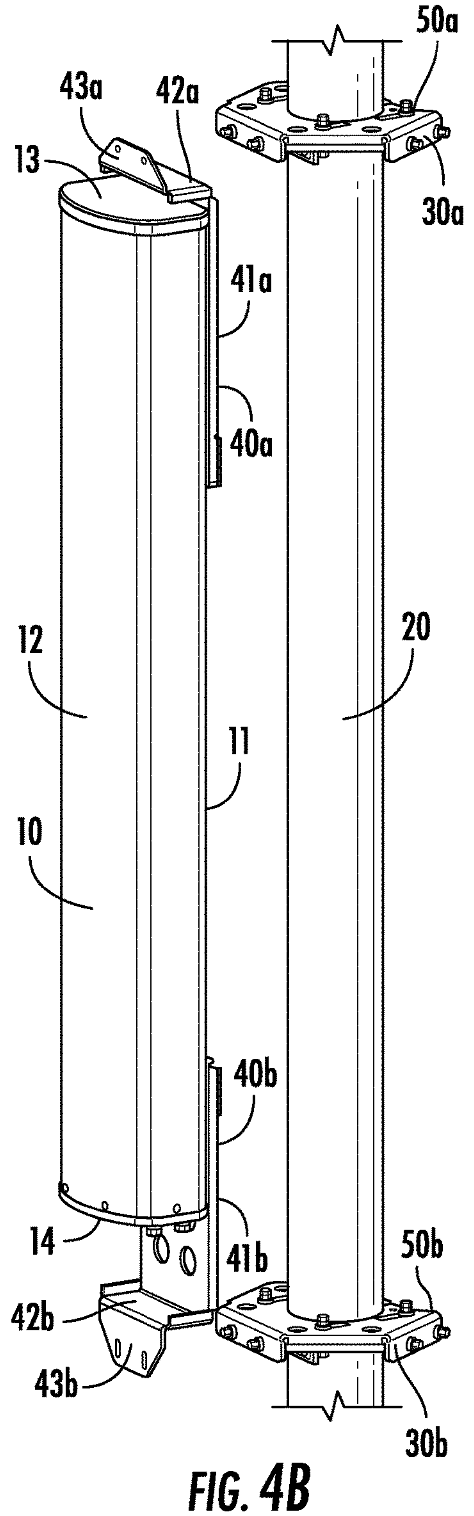
Figure 5A:
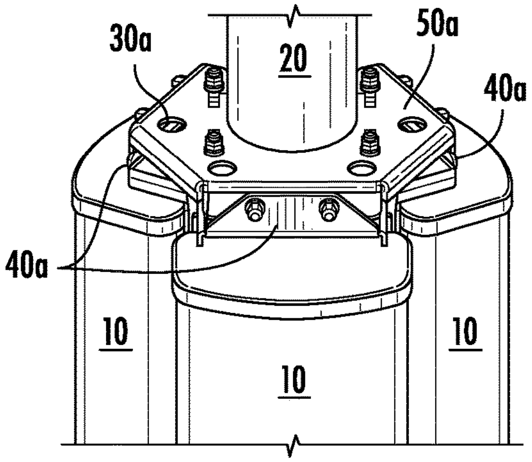
FIGS. 5A and 5B are partial views of the base station antenna system of FIG. 3.
Figure 5B:
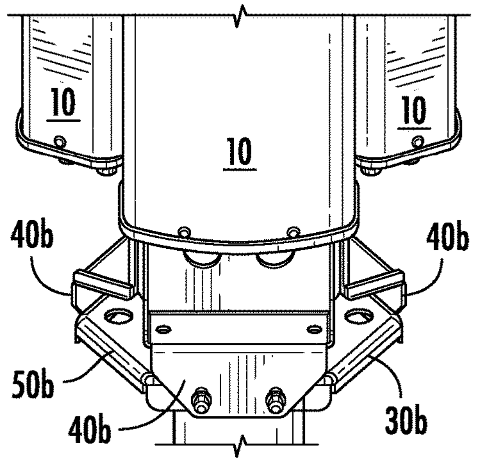

FIGS. 4A and 4B are two different exploded views of the base station antenna system 100 of FIG. 3. In FIG. 4B, only one of the base station antennas 10 is depicted, and the other two base station antennas 10 are omitted. FIG. 5A is a partial view of an upper end section of the base station antenna system 100 of FIG. 3, and FIG. 5B is a partial view of a lower end section of the base station antenna system 100 of FIG. 3.

Figure 6:
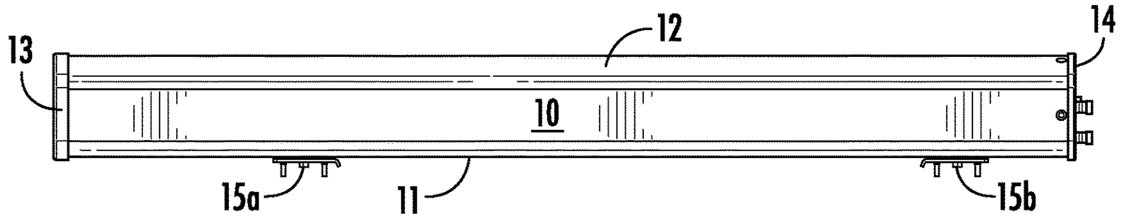
FIG. 6 is a side view of a base station antenna.
Figure 7:
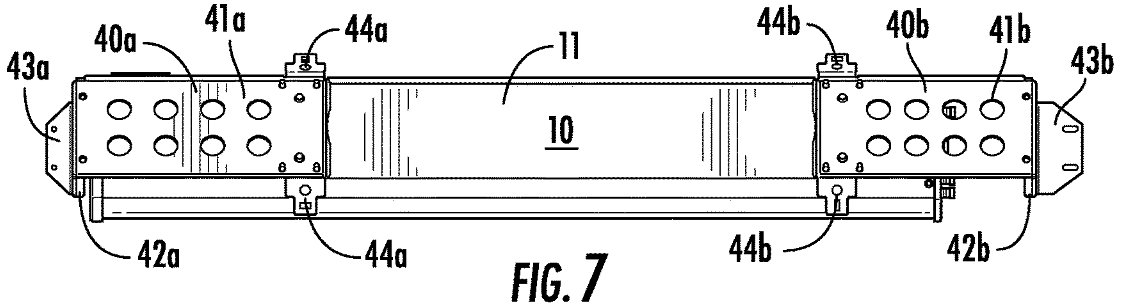
FIG. 7 is a bottom view of the base station antenna of FIG. 6 along with a support member attached to the base station antenna.
Figure 8A:
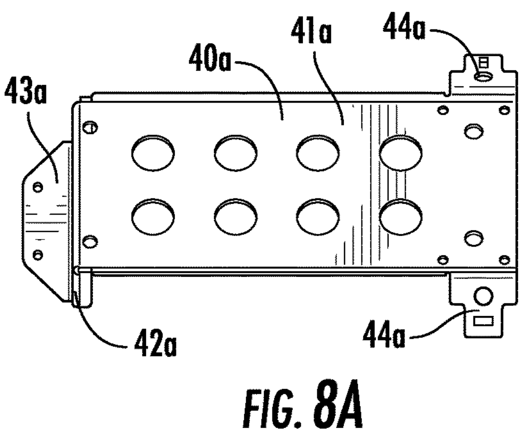
FIGS. 8A and 8B are views of the two support members in FIG. 7.
Figure 8B:
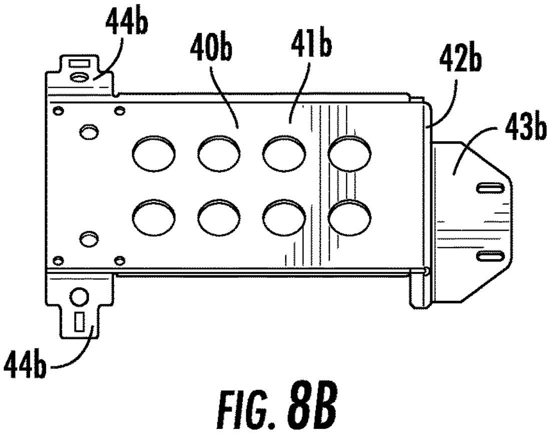
Figure 9A:
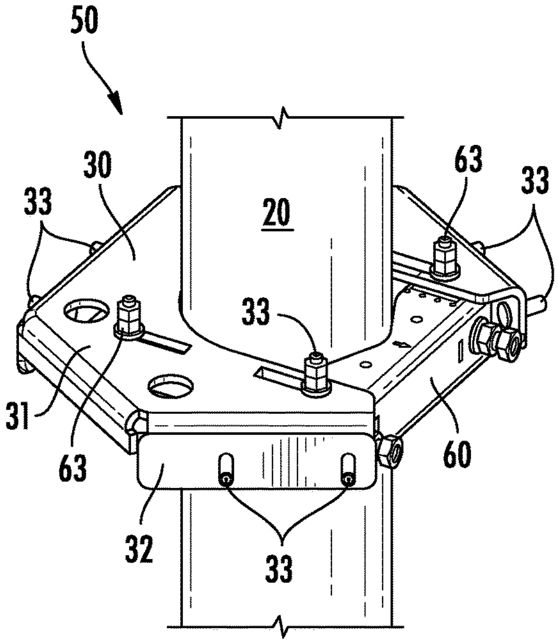
FIGS. 9A and 9B are a perspective view and an exploded view of a structural assembly of the base station antenna system of FIG. 3 in a mounting state.
Figure 9B:
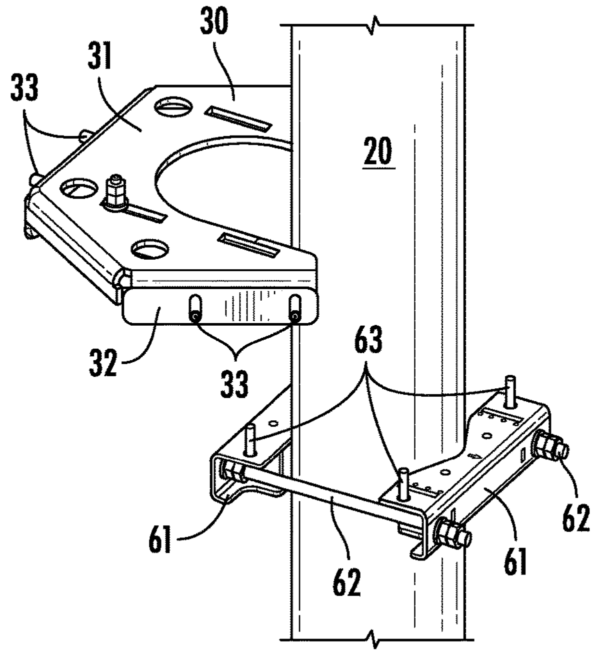
Figure 10A:
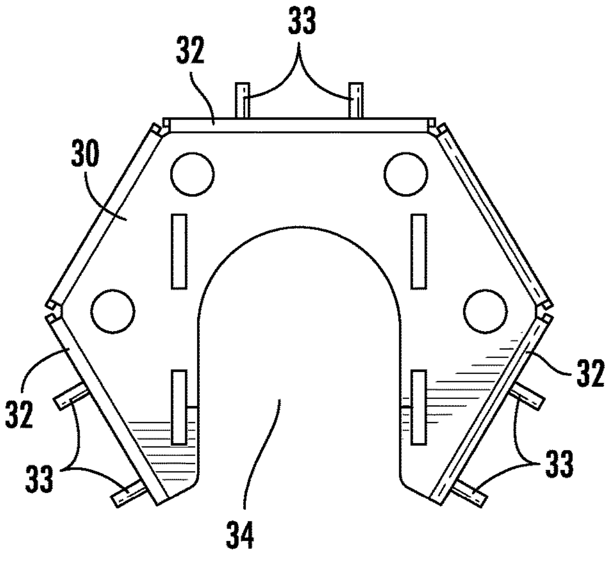
FIGS. 10A and 10B are a top view and a perspective view of a mounting plate of the structural assembly of FIGS. 9A and 9B.
Figure 10B:
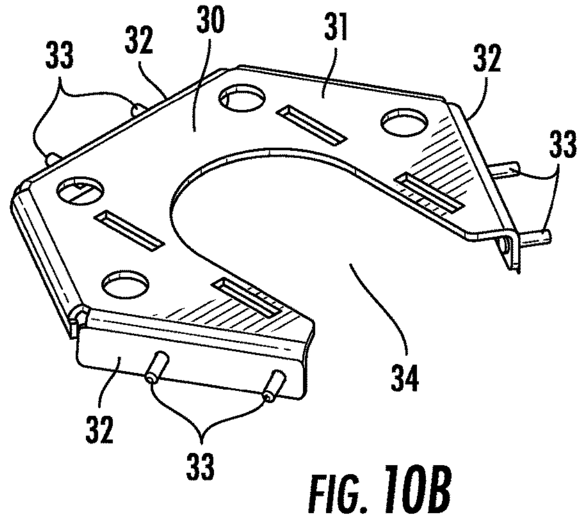

FIG. 6 is a side view of an exemplary base station antenna 10 employed in the base station antenna system 100 of FIG. 3, and FIG. 7 is a bottom view of the base station antenna 10 of FIG. 6 along with support members 40*a*, 40*b* attached to the base station antenna 10. The base station antenna 10 is in the shape of a "flat" column, and has a roughly rectangular cross-section, including a flat inner side 11 and an outer side 12 with a curved or arcuate profile, as well as two narrow sides that connect the inner side 11 and the outer side 12. The base station antenna 10 has an upper end side 13 and a lower end side 14 in the longitudinal direction. Each base station antenna 10 is mounted to the holding pole 20 through corresponding mounting devices in the upper end section and in the lower end section. Each mounting device may include a support member 40*a*, 40*b*.

In the illustrated embodiment, the upper mounting support 40*a* and the lower mounting support 40*b* may be constructed the same or similarly. When they are constructed similarly, they can have different geometric parameters. For example, their first sections, which will be mentioned below, can have different lengths. In embodiments not shown, the upper mounting support 40*a* and the lower mounting support 40*b* may also be differently constructed. For example, the upper mounting support 40*a* may be a plate-like component, and the lower mounting support 40*b* may be a rod component.

The upper support member 40*a* may include a first section 41*a*. The first section 41*a* is configured to, in a mounted state of the base station antenna 10 and the holding pole 20, connect with the inner side 11 of the base station antenna 10 facing the holding pole 20 in the upper end section of the base station antenna 10. For example, the first section 41*a* can be connected to the inner side 11 of the base station antenna 10 at its free end, and thus the first section 41*a* is constituted as a cantilever. For this reason, in the upper end section of the base station antenna 10, the inner side 11 of the base station antenna 10 may have an upper connecting structure 15*a*. The first section 41*a* can be fastened on the connecting structure 15*a*. The connecting structure 15*a* may comprise a plurality of screw bolts fastened to the radome of the base station antenna, and the first section may comprise a plurality of mounting holes, through which the screw bolts can penetrate, and then respective nuts can be tightened onto the screw bolts, and thus the first section 41*a* is fastened on the radome. The first section 41*a* may extend parallel to the longitudinal direction of the base station antenna 10, wherein the first section 41*a* may extend parallel to or may abut against the flat inner side 11 of the base station antenna 10 at a very small distance. The first section 41*a* may be a plate-like component. For the purpose of reducing weight, the first section 41*a* may be provided with an array of holes.

The upper support member 40*a* may include a second section 42*a*. The second section is configured to, in the mounted state of the base station antenna 10 and the holding pole 20, extend from the first section 41*a* in a direction away from the holding pole 20 and extend beyond the end side 13 of the upper end section of the base station antenna 10 in a longitudinal direction of the base station antenna 10. Advantageously, the second section 42*a* may extend parallel to the upper end side 13 of the base station antenna 10. In particular, the second section 42*a* does not extend beyond the outer side 12 of the base station antenna 10 facing away from the holding pole 20 in the radial direction. The second section 42*a* may be a plate-like component. The second section 42*a* may be bent approximately 90° relative to the first section 41*a*.

The upper support member 40*a* may include a connecting portion 43*a*, which is connected with the second section 42*a*. The connecting portion 43*a* may be configured to be directly or indirectly connected with the holding pole 20 in the mounted state of the base station antenna 10 and the holding pole 20. Advantageously, the connecting portion 43*a* extends from the second section 42*a* in a direction away from the base station antenna 10, and the connecting portion 43*a* may be bent approximately 90° relative to the second section.

The three upper support members 40*a* can be connected to the holding pole 20 through a common structural assembly 50*a*, and this structural assembly is fastened to the holding pole 20. The structural assembly 50*a* will be described in more detail later.

In order to improve the overall stability of the three base station antennas 10 connected to the holding pole 20 by the three support members 40*a*, the first section 41*a* of the three support members 40*a* may have two opposing connecting members 44*a*, respectively. Each two adjacent support members 41*a* may be mutually connected through their two adjacent connecting members 44*a*, for example, through the connection of bolts, so that the three support members 41*a* can form a ring surrounding the holding pole 20, thus improving the overall strength of the three support members 40*a*.

The lower support member 40*b* may include a first section 41*b*. The first section 41*b* is configured to, in the mounted state of the base station antenna 10 and the holding pole 20, connect with the inner side 11 of the base station antenna 10 facing the holding pole 20 in the lower end section of the base station antenna 10. For example, the first section 41*b* can be connected to the inner side 11 of the base station antenna 10 at its free end, and thus the first section 41*b* is constituted as a cantilever. For this reason, in the lower end section of the base station antenna 10, the inner side 11 of the base station antenna 10 may have a lower connection structure 15*b*. The first section 41*b* can be fastened on the connecting structure 15*b* in a manner similar to fixing the first section 41*a* on the connecting structure 15*a*. The first section 41*b* may extend parallel to the longitudinal direction of the base station antenna 10, wherein the first section 41*b* may extend parallel to or may abut against the flat inner side 11 of the base station antenna 10 at a very small distance. The first section 41*b* may be a plate-like component. For the purpose of reducing weight, the first section 41*b* may be provided with an array of holes.

The lower support member 40*b* may include a second section 42*b*. The second section is configured to, in the mounted state of the base station antenna 10 and the holding pole 20, extend from the first section 41*b* in a direction away from the holding pole 20 and extend beyond the end side 14 of the lower end section of the base station antenna 10 in the longitudinal direction of the base station antenna 10. Advantageously, the second section 42*b* may extend parallel to the lower end side 14 of the base station antenna 10. In particular, the second section 42*b* does not extend beyond the outer side 12 of the base station antenna 10 facing away from the holding pole 20 in the radial direction. The second section 42*b* may be a plate-like component. The second section 42*b* may be bent approximately 90° relative to the first section 41*b*.

The lower support member 40*b* may include a connecting portion 43*b*, which is connected with the second section 42*b*. The connecting portion 43*b* may be configured to be directly or indirectly connected with the holding pole 20 in the mounted state of the base station antenna 10 and the holding pole 20. Advantageously, the connecting portion 43*b* extends from the second section 42*b* in a direction that faces away from the base station antenna 10, and the connecting portion 43*b* may be bent approximately 90° relative to the second section 42*b*.

The three lower support members 40*b* can be connected to the holding pole 20 through a common structural assembly 50*b*, and the structural assembly 50*b* is fastened to the holding pole 20. With regard to the structural component 50*b*, it will be described in more detail below.

In order to improve the overall stability of the three base station antennas 10 connected to the holding pole 20 by the three support members 40*b*, the first section 41*b* of the three support members 40*b* may have two opposing connecting members 44*b*, respectively. Each two adjacent support members 41*b* may be mutually connected through their two adjacent connecting members 44*b*, for example, through the connection of bolts, so that the three support members 41*b* can form a ring surrounding the holding pole 20, thus improving the overall strength of the three support members 40*b*.

Next, an exemplary structural assembly 50 will be described with reference to FIGS. 9A and 9B and FIGS. 10A and 10B. The three upper support members 40*a* can be connected to the holding pole 20 through an upper structural assembly 50*a*. The three lower support members 40*b* can be connected to the holding pole 20 through a lower structural assembly 50*b*. The upper structural assembly 50*a* may have the same or similar structure as the lower structural assembly 50*b*. The upper structural assembly 50*a* may have a larger size than the lower structural assembly 50*b* so as to determine a suitable mechanical tilt angle of each base station antenna 10.

When the structural assembly 50 as shown is matched with the upper support member 40*a*, the structural assembly 50 corresponds to the upper structural assembly 50*a* shown in FIGS. 3, 4A, 4B, and 5A, wherein the mounting plate 30 as shown corresponds to the mounting plate 30*a*. When the structural assembly 50 is matched with the lower support member 40*b*, the structural assembly 50 corresponds to the structural assembly 50*b* shown in FIGS. 3, 4A, 4B, and 5B, wherein the mounting plate 30 corresponds to the mounting plate 30*b*.

The structural assembly 50 may include a clamping device 60. The clamping device may include a pair of clamping members 61. The pair of clamping members may be fastened on the holding pole 20 through two bolt devices 62. Each clamping member 61 may have teeth in an area engaged with the holding pole 20 so that the clamping member 61 can be firmly and reliably engaged with the holding pole 20.

The mounting plate 30 may be mounted to the clamping device 60 from above the clamping device 60, or may be mounted to the pair of clamping members 61 from above the pair of clamping members 61. For example, the clamping device 60 may have four bolts 63 on a pair of clamping devices 61. The mounting plate 30 can be fastened to the clamping device 60 through these bolts 63.

The mounting plate 30 may have a flat main surface 31. The mounting plate 30 may have a roughly hexagonal outer profile. The main surface 31 may have a notch 34 that is open from its center to one side of the hexagon. The mounting plate 30 may be fitted onto the holding pole 20 through the notch 34. In other words, the holding pole 20 may enter the notch 34 of the mounting plate 30 relative to the mounting plate 30 until it touches the bottom of the notch 34. The mounting plate 30 may have three connecting structures evenly distributed in the circumferential direction, and each connecting structure may include an abutting surface 32 extending substantially parallel to the longitudinal axis of the holding pole and two bolt devices 33. Each abutting surface 32 may correspond to one side of the hexagonal outer profile. Each abutting surface 32 may be bent approximately 90° relative to the main surface 31. Each connecting structure may be directly connected with a corresponding connecting portion 43*a*, 43*b* of the support member 40$a$, 40$b$, wherein the abutting surface 32 and the connecting portion 43$a$, 43$b$ are pressed against each other through two bolt devices 33.

Figure 11:
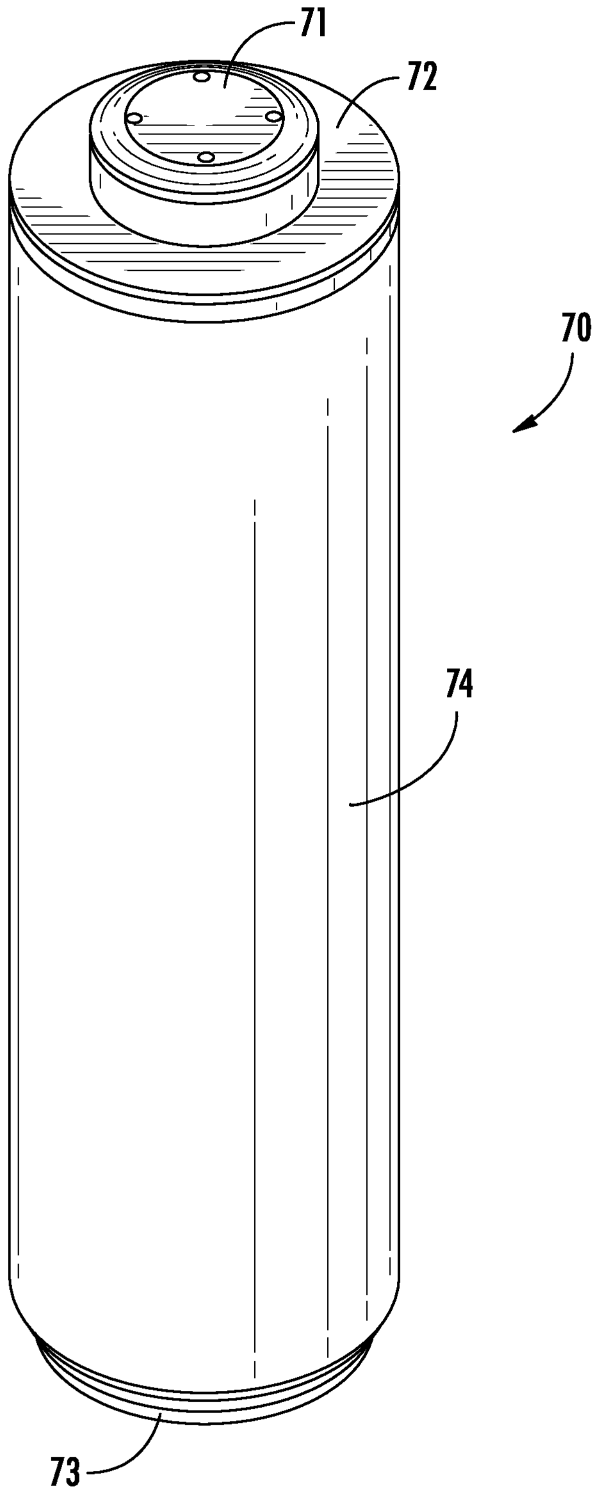
FIG. 11 is a perspective view of an exemplary shroud.

FIG. 11 is a perspective view of a shroud 70 according to an exemplary embodiment. The shroud 70 is roughly cylindrical, including a top cover 71, a top plate 72, a bottom plate 73, and a peripheral wall 74, and the top cover 71 is detachably connected to the top plate 72. The shroud 70 has an internal chamber. The shroud 70 can cover the entire base station antenna system 100, and thus the base station antenna system 100 can be protected by the shroud 70 and an aesthetic appearance can be provided. The shroud 70 may be, for example, made of engineering plastics. It can be understood well, shrouds for the known base station antenna systems as shown in FIGS. 1A, 1B and FIGS. 2A and 2B have a larger diameter than shrouds for the base station antenna systems having the same base station antennas according to the embodiments of the present invention.

In the embodiment as shown in FIG. 3, the base station antenna system 100 includes three base station antennas 10. It can be understood that one or two of the three base station antennas 10 may be omitted according to actual needs.

In the embodiment as shown in FIG. 3, the base station antenna system 100 includes three flat column-shaped base station antennas 10. It can be understood that the base station antenna system may include other shapes of base station antennas, such as the cylindrical base station antennas seen in FIG. 1A. It can be understood that the three base station antennas can be constructed the same or differently. For example, a combination of two flat column-shaped base station antennas and one cylindrical base station antenna is possible.

In the embodiment as shown in FIG. 3, base station antenna system 100 includes three base station antennas 10 that are uniformly spaced in the circumferential direction. In an embodiment not shown, the base station antenna system may include two or four base station antennas that are uniformly spaced in the circumferential direction.

In the embodiment as shown in FIG. 3, each base station antenna 10 of the base station antenna system 100 is mounted to the holding pole 20 through a mounting device according to an embodiment of the present invention in two end sections thereof. In an embodiment not shown, each base station antenna 10 may be mounted to the holding pole 20 in its lower end section through a conventional mounting device, and be mounted to the holding pole 20 in its upper end section through a mounting device according to an embodiment of the present invention.

In an embodiment not shown, the base station antenna may be a combined base station antenna, wherein two base station antennas, as a base station antenna assembly, may have a common cylindrical or flat column-shaped radome.

It should be noted that the terminology used here is only for the purpose of describing specific aspects, and not for limiting the disclosure. The singular forms "a" and "the one" as used herein shall include plural forms, unless the context explicitly states otherwise. It can be understood that the terms "including" and "inclusive" and other similar terms, when used in the application documents, specify the existence of the stated operations, elements and/or components, and do not exclude the existence or addition of one or more other operations, elements, components and/or combinations thereof. The term "and/or" as used herein includes all of any combinations of one or more relevant listed items. In the description of the attached drawings, similar reference numerals always indicate similar elements.

The thickness of the elements in the attached drawings may be exaggerated for clarity. In addition, it can be understood that if an element is referred to as being on, coupled to, or connected to, another element, then the element may be directly formed on, coupled to, or connected to the other element, or there can be one or more intervening elements between them. Conversely, if the expressions "directly on", "directly coupled to" and "directly connected to" are used herein, it means that there are no intervening elements. Other words used to describe the relationship between elements should be interpreted similarly, such as "between" and "directly between", "attached" and "directly attached", "adjacent" and "directly adjacent" and so on.

Terms such as "top", "bottom", "upper", "lower", "above", "below", etc. herein are used to describe the relationship of one element, layer or region with respect to another element, layer or region as shown in the attached drawings. It can be understood that in addition to the orientations described in the attached drawings, these terms should also include other orientations of the device.

It can be understood that although the terms "first", "second", etc. may be used herein to describe different elements, these elements should not be limited by these terms. These terms are only used to distinguish one element from another. Therefore, the first element can be referred to as the second element without departing from the teachings of the concept of the present disclosure.

It may also be considered that all the exemplary embodiments disclosed herein may be arbitrarily combined with each other.

Finally, it should be pointed out that the aforementioned embodiments are only used to understand the present disclosure, and do not limit the protection scope of the present disclosure. For those of ordinary skill in the art, modifications can be made on the basis of the aforementioned embodiments, and these modifications do not depart from the protection scope of the present disclosure.

We claim:

1. A mounting device for a base station antenna, wherein the mounting device includes a support member, the support member including:

a first section, the first section being configured to, in a mounted state of a base station antenna and a holding pole, connect with an inner side of the base station antenna facing the holding pole in an end section of the base station antenna;

a second section, the second section being configured to, in the mounted state of the base station antenna and the holding pole, extend from the first section in a direction away from the holding pole and extend beyond an end side of the end section in a longitudinal direction of the base station antenna; and a connecting portion, the connecting portion being connected with the second section, and the connecting portion being configured to be directly or indirectly connected to the holding pole in the mounted state of the base station antenna and the holding pole.

2. The mounting device for a base station antenna according to claim 1, wherein the first section is configured to be connected to the inner side of the base station antenna facing the holding pole at a free end that faces away from the second section.

3. The mounting device for a base station antenna according to claim 1, wherein the first section is configured to extend parallel to a longitudinal direction of the base station antenna in the mounted state of the base station antenna and the pole.

4. The mounting device for a base station antenna according to claim 1, wherein the first section has a connecting member, and the connecting member is configured to connect two adjacent support members.

5. The mounting device for a base station antenna according to claim 1, wherein the second section is configured to extend parallel to the end side of the end section of the base station antenna in the mounted state of the base station antenna and the holding pole.

6. The mounting device for a base station antenna according to claim 1, wherein the second section is configured to, in the mounted state of the base station antenna and the holding pole, not exceed the outer side of the base station antenna facing away from the holding pole in the radial direction.

7. The mounting device for a base station antenna according to claim 1, wherein the connecting portion is configured to extend from the second section in a direction away from the base station antenna in the mounted state of the base station antenna and the holding pole.

8. The mounting device for a base station antenna according to claim 1, wherein at least one of the first section, the second section, and the connecting portion is a plate-like component.

9. The mounting device for a base station antenna according to claim 8, wherein the first section, the second section, and the connecting portion are respectively a flat plate-like component, the second section is bent approximately 90° relative to the first section, and the connecting portion is bent approximately 90° relative to the second section.

10. The mounting device for a base station antenna according to claim 1, wherein the mounting device includes a mounting plate, the mounting plate is configured to be mounted to a holding pole, and a connecting portion of the support member is configured for connection with the mounting plate.

11. The mounting device for a base station antenna according to claim 10, wherein the mounting device includes a clamping device, the clamping device being configured to be fastened to the holding pole, and the mounting plate being configured to be mounted to the clamping device from above the clamping device.

12. The mounting device for a base station antenna according to claim 11, wherein the clamping device includes a pair of clamping members, the pair of clamping members being configured to hold the holding pole tightly.

13. The mounting device for a base station antenna according to claim 10, wherein the mounting plate has a main surface and an abutting surface bent from the main surface, the abutting surface being configured to be connected with a connecting portion of a support member, wherein the main surface has an open notch and the mounting plate is capable of being fitted onto a holding pole through the notch.

14. The mounting device for a base station antenna according to claim 13, wherein the mounting plate has a generally hexagonal outer profile, the notch is open from the center of the main surface to one side of the hexagon, and the mounting plate has three abutting surfaces bent from the main surface, each abutting surface corresponding to one side of the hexagon, and three abutting surfaces having an angular spacing of 120°.

15. A base station antenna system, comprising:
- a base station antenna, the base station antenna having two opposing end sections; and
- a mounting device comprising:
  - a first section, the first section being configured to, in a mounted state of a base station antenna and a holding pole, connect with an inner side of the base station antenna facing the holding pole in an end section of the base station antenna;
  - a second section, the second section being configured to, in the mounted state of the base station antenna and the holding pole, extend from the first section in a direction away from the holding pole and extend beyond an end side of the end section in a longitudinal direction of the base station antenna; and
  - a connecting portion, the connecting portion being connected with the second section, and the connecting portion being configured to be directly or indirectly connected to the holding pole in the mounted state of the base station antenna and the holding pole;
- wherein at least one of the two end sections of the base station antenna is mounted to a holding pole with the mounting device.

16. The base station antenna system according to claim 15, wherein the base station antenna system includes a plurality of base station antennas, and each base station antenna is mounted to a holding pole through the mounting device in at least one of the two end sections of the base station antenna.

17. The base station antenna system according to claim 15, wherein the base station antenna system includes three base station antennas, and each base station antenna is mounted to a holding pole through a corresponding mounting device in two end sections of the base station antenna.

18. The base station antenna system according to claim 17, wherein the base station antenna system includes a first mounting plate, the first mounting plate being configured to be mounted to a holding pole, and three upper support members that match upper end sections of three base station antennas are connected to the first mounting plate through corresponding connecting portions.

19. The base station antenna system according to claim 17, wherein the first sections of the three upper support members that match the three upper end sections of the three base station antennas have two opposing connecting members respectively, and each two adjacent upper support members are mutually connected through two adjacent connecting members thereof, so that the three upper support members form a ring surrounding a holding pole.

20. The base station antenna system according to claim 17, wherein the base station antenna system includes a second mounting plate which is configured to be mounted to a holding pole, and three lower support members that match lower end sections of three base station antennas are connected to the second mounting plate through corresponding connecting portions.

* * * * *